United States Patent [19]

Koop

[11] Patent Number: 4,796,275
[45] Date of Patent: Jan. 3, 1989

[54] FLOATING MIRROR MOUNT

[75] Inventor: Dale E. Koop, Sunnyvale, Calif.

[73] Assignee: Rofin-Sinar, Inc., San Jose, Calif.

[21] Appl. No.: 32,860

[22] Filed: Mar. 31, 1987

[51] Int. Cl.$^4$ ............................................... H01S 3/08
[52] U.S. Cl. ..................................... 372/107; 372/108
[58] Field of Search ................. 372/107, 109, 108, 34; 350/252, 253, 257, 632

[56] References Cited

U.S. PATENT DOCUMENTS

| | | | |
|---|---|---|---|
| 3,953,113 | 4/1976 | Shull | 372/107 |
| 4,226,505 | 10/1980 | Hashimoto et al. | 350/252 |
| 4,433,897 | 2/1984 | Kojima et al. | 350/252 |
| 4,464,763 | 8/1984 | Mohler | 372/107 |
| 4,613,972 | 9/1986 | Bettman | 372/107 |

*Primary Examiner*—William L. Sikes
*Assistant Examiner*—B. Randolph

*Attorney, Agent, or Firm*—Donald C. Feix; T. M. Freiburger

[57] ABSTRACT

A floating mirror mount for a mirror of a laser comprises a mirror having a front surface and a back surface. A keeper encircles the mirror and has a peripheral flange which engages the front surface of the mirror when the mirror mount is not installed in a laser. A retainer is connected to the keeper and has a spring seating surface. A movable spring plate has a surface engageable with the back surface of the mirror. Springs are engagble with the spring seating surface and with the spring plate for exerting a resiliant biasing force on the mirror which is sufficiently large to force the mirror against the peripheral flange of the keeper when the mirror is not installed in a laser. The spring force is sufficiently small to permit the mirror to be moved out of contact with the peripheral flange and to a different location when the front surface of the mirror is engaged by mirror positioning structure of the laser in the course of installing the mirror mount in a laser.

9 Claims, 1 Drawing Sheet

FLOATING MIRROR MOUNT

BACKGROUND OF THE INVENTION

This invention relates to a mirror mount for a mirror used in a laser.

This invention relates particularly to a mirror mount which provides a floating suspension of the mirror within the mount.

Mirrors used in lasers must be accurately positioned for proper operation of the laser.

It is desirable to be able to install mirrors with a minimum amount of adjustment or tuning of the mirror position.

It is also desirable to be able to install and/or replace the mirror quickly and with a minimum of tools and steps or operations.

In some lasers, particularly high power molecular gas lasers, the mirrors are the highest frequency maintenance item. Mirror replacement is the limiting factor on how long the laser can be operated without having to be shut down.

SUMMARY OF THE PRESENT INVENTION

It is a primary object of the present invention to construct a floating mirror mount which avoids or overcomes the problems associated with mirror mounts of the prior art.

It is a related object to construct a mirror mount which enables a mirror and certain associated keeper and retainer structure to be installed in the laser as a unit and to be removed from the laser as a unit.

It is a related object to construct the floating mirror mount so that the assembly can be installed and removed by hand without the need for tools.

It is another important object of the present invention to support the mirror within the mirror mount by a floating or resilient suspension so that the mirror can be engaged and moved to a predetermined, fixed operating position by mirror positioning structure of the laser as the mirror mount assembly is installed in the laser.

In accomplishing this object, a resiliently biased spring plate permits the mirror to be lifted off of a flange of a keeper and to be progressivly moved inward within the mirror mount as the mirror mount assembly is screwed into position. The spring plate then retains the mirror at the predetermined, fixed location so that no subsequent adjustment of the mirror is required to tune the laser when one mirror is removed and the same or another mirror is installed as a replacement.

It is another object of the present invention to use a surface of a chiller as the lens positioning surface. The chiller not only positions the mirror, as described above, but also cools the mirror. This extends the period of time during which the laser can be operated with that mirror. Cooling the mirror minimizes heat accelerated surface defects which can result from undesirably high mirror temperatures.

In a specific embodiment of the present invention the floating mirror mount comprises a keeper which encircles the mirror and which has a peripheral flange engaging the front surface of the mirror when the mirror is not installed in a laser. A retainer is connected to the keeper and has a spring seating surface. A removable spring plate is positioned within the retainer and has a surface engaged with the back surface of the mirror. A number of springs are engaged with the spring seating surface and with the spring plate and exert a resilient biasing force on the mirror. The biasing force is sufficiently large to force the mirror against the peripheral flange of the keeper when the mirror is not installed in a laser. The resilient biasing force is sufficiently small to permit the mirror to be moved out of contact with the peripheral flange and to a different location when the front surface of the mirror is engaged by mirror positioning structure of the laser in the course of installing the mirror mount in a laser.

A spacer member is disposed between the keeper and a retainer, and different size spacer members can be used to compensate for different height mirrors.

The floating mirror mount includes a rotatable nut. The nut has an inwardly extending flange which is engagable with the spacer and which is also engagable with the retainer. The nut also has an external threaded portion which is engagable with coacting threads in a tilt plate of a laser mirror mounting assembly.

The flange of the nut acts on the spacer to move the mirror mount inwardly with respect to the tilt plate as the nut is threaded into the tilt plate. This causes the mirror positioning structure of the laser to engage the front surface of the mirror and to lift the mirror off the peripheral edge of the keeper (against the resilient bias exerted by the spring force) as the nut and associated mirror mount structure are screwed into the tilt plate.

The flange of the nut engages a coacting surface of the retainer when the nut is unscrewed from the tilt plate. The nut permits the mirror mount to be installed and replaced in the tilt plate as a complete, self-contained mount assembly by hand and without other tools.

The tilt plate has a chiller member attached to the chill plate and the chiller member (as noted above) has an outwardly projecting and annularly extending surface which is engagable with the front surface of the mirror as the mirror mount is screwed into the tilt plate. This surface of the chiller member positions the front surface of the mirror at a predetermined, fixed position as the nut and the associated mirror mount are fully screwed down into operative position in the laser tilt plate. This is the exact operative position of the mirror required for proper tuning of the laser, so no subsequent adjustment or tuning of the laser is required.

The surface of the chiller which is engaged with the mirror is sufficiently large so as to exert a significant cooling effect during operation of the laser.

The entire tilt plate assembly is associated with a base plate of the laser by means of a flexible, stainless steel diaphragm and clamping rings. The required tilt adjustment of the tilt plate with respect to the base plate can therefore be accomplished by means of a relatively low cost flat stock diaphragm which does not require machining.

One part of the diaphragm clamp structure is also formed with an aperture so that this clamp structure serves a dual purpose.

Floating mirror mount apparatus and methods which are constructed as described above and which are effective to function as described above constitute further, specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles.

Other embodiments of the invention embodying the same or equivalent principles may be used and structural changes may be made as desired by those skilled in the art without departing from the present invention and the purview of the appended claims.

DETAILED DESCRIPTION OF THE PREFERRED EMODIMENT

Figure 1:
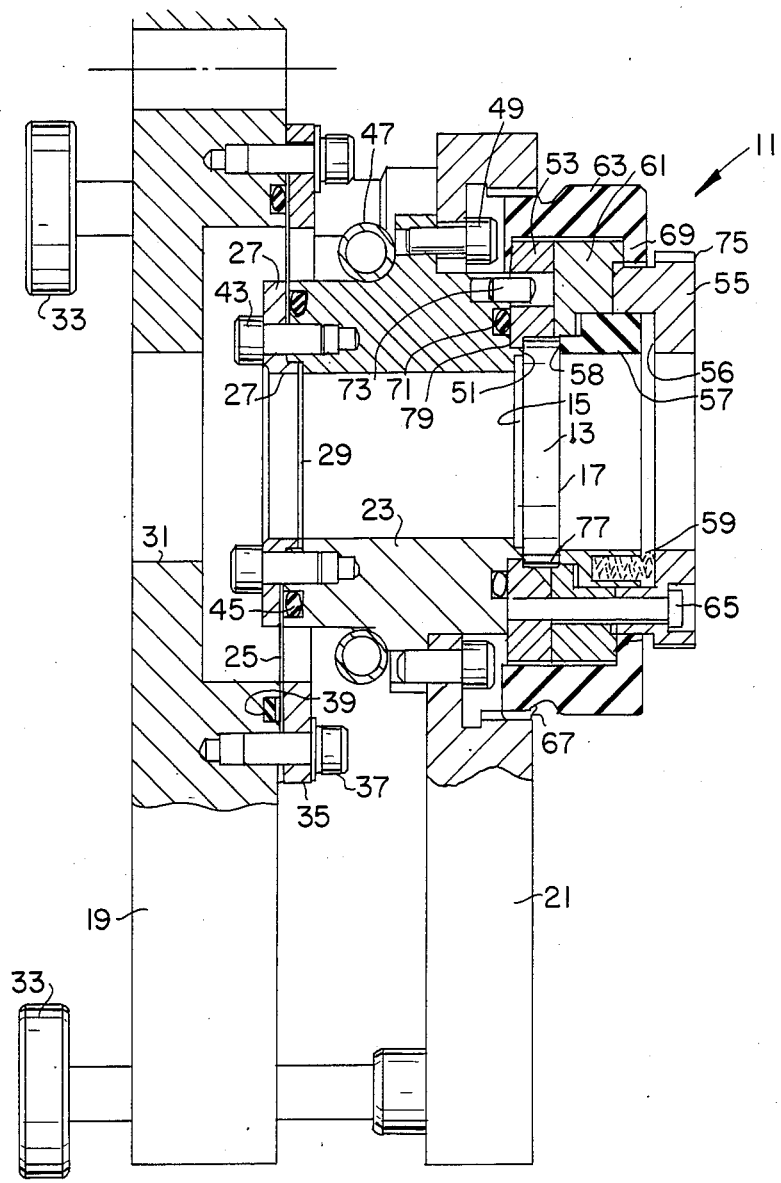
FIG. 1 is an enlarged elevation view, partly broken away and in cross section to show details of construction, of a floating mirror mounting assembly for mounting an end mirror in a tilt plate of a laser in accordance with one embodiment of the present invention.

A floating mirror mount constructed in accordance with one embodiment of the present invention is indicated generally by the reference numeral 11 in FIG. 1.

The floating mirror mount 11 shown in FIG. 1 is useful, in one specific embodiment of the present invention, for mounting an end mirror in a high power, carbon dioxide laser of the kind illustrated and described in pending U.S. patent application Ser. No. 06/811,593 filed Dec. 19, 1985 by Joseph F. Rando, et al. and entitled "Fast Axial Flow Laser Circulating System". This co-pending application is assigned to the same assignee as the assignee of the present application, and this application Ser. No. 06/811,593 is incorporated by reference in this present application in accordance with the provisions of Section 608.01(p)(B) of the *Manual of Patent Examining Procedure* of the U.S. Patent and Trademark Office.

The floating mirror mount of the present invention is however, not limited to high power carbon dioxide lasers or to end mirrors. The floating mirror mount can, for example, also be used to mount fold path mirrors.

With reference to FIG. 1 of the drawings, the floating mirror mount 11 comprises a mirror 13 having a front surface 15 and a rear surface 17.

The front surface 15 is exposed to the heat developed in the cavity of the laser.

As illustrated in FIG. 1, the laser includes a base plate 19, a tilt plate 21, a chiller member 23, a flexible diaphragm 25, and a clamping ring 27 which provides an aperture 29.

The base plate 19 is mounted directly to the laser tube (which is not illustrated in FIG. 1), and the base plate 19 has a bore 31 aligned with the laser cavity.

Tilt adjustment screws 33 are associated with the base plate 19 and the tilt plate 21 for adjusting the tilt of the plate 21 (and the related mirror mount and chiller assembly associated with the tilt plate 21).

The flexible diaphragm 25 permits the tilting movement of the tilt plate and related components while providing a gas tight seal at that end of the laser cavity.

The diaphragm 25 is clamped to the base plate 19 by a clamping ring 35, cap screws 37 and an O-ring seal 39.

The flexible diaphragm 25 is clamped to the chiller member 23 by a clamping ring 27, cap screws 43 and an O-ring seal 45.

The clamping ring 27 also has the aperture 29 formed in the inner, central part of the ring so that the clamping ring 27 serves dual function—as a clamping ring and as an aperture.

A conduit 47 encircles and engages an outer periphery of the chiller member 23. Cooling fluid circulated through this conduit 47 enables the chiller member 23 to provide cooling for the associated floating mirror mount components during operation of the laser.

The chiller member 2 is connected to the tilt plate 21 by cap screws 49.

It should be noted that the chiller member 23 has an annularly and outwardly projecting flange 51 which engages the outer periphery front surface 15 of the mirror 13 when the floating mirror mount is assembled into its operative position in the tilt plate 21 as illustrated in FIG. 1.

The structural features and the functions of the floating mirror mount 11 will no be described.

The floating mirror mount 11 comprises the mirror 13, a keeper 53, a retainer 55, a movable spring plate 57, a number of springs 59, a spacer 61, and a nut 63.

The retainer 55 has a surface 56 which serves as a spring seating surface.

The springs 59, as illustrated in FIG. 1, engage spring seating surfaces at the lower ends of the bores in which the springs are located in the movable spring plate 57.

While coil springs have been illustrated in FIG. 1, other resilient biasing means, such as, for example, wavy springs can also be used.

The movable spring plate 57 has a surface 58 which engages the outer periphery of the back side 17 of the mirror. This spring plate distributes the spring forces of the individual springs 59 substantially uniformly about the outer periphery of the mirror 13.

The spacer 61 permits the height of the spacer 61 to be matched to the height of the mirror 13.

The keeper 53 and the retainer 55 are connected together by cap screws 65.

The nut 63 has outer threads 67 which engage coacting threads in the tilt plate 21. The nut 63 is rotatable with respect to the keeper 53, the spacer 61 and the retainer 55 as the nut 63 is screwed into the tilt plate. The nut 63 has a flange 69, and the undersurface 69 engages a coacting surface of the spacer 61 to move the entire mirror mount assembly into position in the tilt plate 21 as the nut 6 is rotated in a direction to install the mirror mount in the laser.

An O-ring 71 provides a seal between the lower surface of the keeper 53 and the chiller 23 when the mirror mount is fully installed.

An alignment pin 73 may be used to provide a desired alignment of the mirror mount with respect to the laser.

The flange 69 of the nut 63 is engagable with a coacting, flanged surface of the retainer 55 to withdraw the mirror mount as a complete assembly when the nut is rotated in a direction to remove the mirror mount from the laser.

This flanged portion of the retainer 55 may also be formed with external threads 75 so that a power monitor or other apparatus can be directly connected to the mirror mount.

An O-ring seal 77 is preferably included between the spacer 61 and the keeper 53 and about the outer periphery of the mirror 13 as illustrated in FIG. 1.

The keeper 53 encircles the mirror 13 as illustrated in FIG. 1 and has an inwardly extending flange 79 which provides an upper surface for engaging the front surface of the mirror when the mirror mount is not installed in a laser.

In this situation, the springs 59 resiliently bias the spring plate 57 outwardly from the surface 56 of the retainer, and the surface 58 of the spring plate pushes on the back face 17 of the mirror to engage the front surface 15 of the mirror with the adjoining surface of the flange 79 of the keeper.

Thus, in this mode of operation, the floating mirror mount 11 is a self-contained assembly which can be removed from the laser and replaced as a entire assembly.

When the mirror mount 11 is installed in the laser by turning the nut 63 in a direction to pull the entire mirror mount 11 into operative position, the upstanding flange 51 of the chiller engages the front surface 15 of the mirror and progressively lifts the mirror off the keeper flange 79 (against the resilient bias provided by the springs 59 and spring plate 57) until the mirror mount is fully screwed into the tilt plate 21. At that point the position of the mirror surface 15 is determined by the location of the mirror engaging surface of the chiller flange 51. The mirror surface 15 is therefore always located exactly at that location, and it is therefore not necessary to retune the laser when a floating mirror mount 11 is removed and reinstalled or replaced by another mirror mount assembly.

The way in which the mirror 13 is engaged with the flange 51 of the chiller 23 when the laser is operating has a further benefit. This direct engagement of the mirror with the chiller provides substantial cooling for the mirror and can therefore help prolong the amount of time that the mirror 13 can be used without having to be replaced.

This can be particularly important in high power molecular gas lasers where the inner surface 15 of the mirror will be directly exposed to powers in the range of 2,000 to 3000 watts.

The diaphragm 25 is preferably a stainless steel diaphragm. Using a sheet stock diaphragm and clamping arrangement for a sheet type diaphragm provides significant cost advantages over machining a thin diaphragm section out of heavier stock material.

While I have illustrated and described the preferred embodiments of the invention, it is to be understood that these are capable of variation and modification, and I therefore do not wish to be limited to the precise details set forth, but desire to avail myself of such changes and alterations as fall within the purview of the following claims.

I claim:

1. A floating mirror mount for a mirror of a laser, said floating mirror mount comprising, a mirror having a front surface and a back surface, a keeper encircling the mirror and having a peripheral flange engaging the front surface of the mirror when the mirror is not installed in a laser, a retainer positioned rearwardly of the back surface of the mirror and connected to the keeper and having a spring seating surface, spring means engageable with said spring seating surface of said retainer for exerting a resilient biasing force on the mirror urging the mirror away from said retainer, said force being sufficiently large to force the mirror against said peripheral flange of said keeper when the mirror is not installed in a laser but sufficiently small to permit the mirror to be moved out of contact with said peripheral flange and retracted to a different location toward said retainer when the front surface of the mirror is engaged by mirror positioning structure of the laser in the course of installing the mirror mount in a laser, so that the mirror floats with respect to said keeper and the retainer, and fastening means for connecting said retainer to said mirror positioning structure of the laser on installation of the mirror mount in the laser.

2. The invention defined in claim 1 including a spacer member disposed between said keeper and said retainer.

3. The invention defined in claim 2 including a nut having an inwardly extending flange surface engagable with the spacer member and having an external threaded portion engagable with coacting threads in a tilt plate, comprising a part of said mirror positioning structure of the laser, and wherein the flange of the nut acts on the spacer to move the mirror mount inwardly with respect to the tilt plate as the nut is threaded into the tilt plate, drawing said retainer, the spacer member and said keeper toward the tilt plate to permit said mirror positioning structure of the laser to lift the front surface of the mirror off said peripheral flange against the resilient bias exerted by the spring force as the nut and associated mirror mount structure are screwed into the tilt plate.

4. The invention defined in claim 3 wherein the flange of the nut has a second surface engagable with a coacting surface of said retainer when the nut is unscrewed from the tilt plate whereby the mirror mount can be installed and replaced in the tilt plate as a complete, self-contained mirror mount assembly by hand and without tools.

5. The invention defined in claim 3 wherein said tilt plate has a chiller member attached to the tilt plate and wherein the chiller member has an outwardly projecting and annularly extending surface engagable with the front surface of the mirror and effective to position the front surface of the mirror at a predetermined, fixed position as the nut and the associated mirror mount are fully screwed down into operative position in the laser tilt plate.

6. The invention defined in claim 5 wherein the surface of the chiller member engaged with the mirror is sufficiently large, presenting a sufficiently large area of contact between the chiller member and the front surface of the mirror, as to exert a significant cooling effect on the mirror during operation of the laser.

7. The invention defined in claim 5 wherein the chiller member has an inner bore aligned with the cavity of the laser, the laser has a base plate having a bore aligned with the cavity of the laser, the base plate has a counter bore at the end adjacent the tilt plate, a diaphragm extends across the counter bore and is clamped to the base plate and to the lower end of the chiller member to provide a gas tight seal at that end of the laser cavity, the diaphragm has an internal bore at least as large as the bore in the chiller member, and the diaphragm is a flexible steel diaphragm which provides sufficient flexibility for tilt adjustment of the tilt plate and the associated lens mount and the chiller assembly with respect to the base plate.

8. The invention defined in claim 7 including an aperture ring which forms part of the clamp for clamping the diaphragm to the lower end of the chiller and which has an inner opening forming the aperture for that end of the laser cavity.

9. The invention defined in claim 1 including a movable spring plate having a surface engaged against the back surface of the mirror, and said spring plate also being engaged with said spring means to receive the biasing force and apply it to the mirror.

* * * * *